J. C. TAUBER.

Soldering Tools.

No. 130,332. Patented Aug. 6, 1872.

ATTEST:
Harry S. Sprague.
H. F. Eberts.

INVENTOR:
John C. Tauber,
per attorney,
Thos. S. Sprague

UNITED STATES PATENT OFFICE.

JOHN C. TAUBER, OF RIDGEVILLE, INDIANA.

IMPROVEMENT IN SOLDERING-TOOLS.

Specification forming part of Letters Patent No. 130,332, dated August 6, 1872.

*To whom it may concern:*

Be it known that I, JOHN C. TAUBER, of Ridgeville, in the county of Randolph and State of Indiana, have invented a new and useful Improvement in a Soldering-Tool; and I do declare that the following is a true and accurate description thereof, reference being had to the accompanying drawing and to the letters of reference marked thereon and being a part of this specification, in which—

Figure 1:
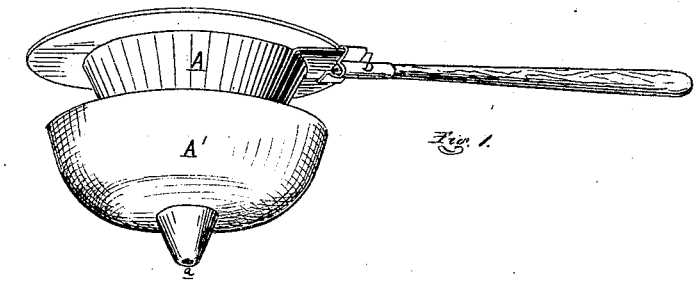
Figure 2:
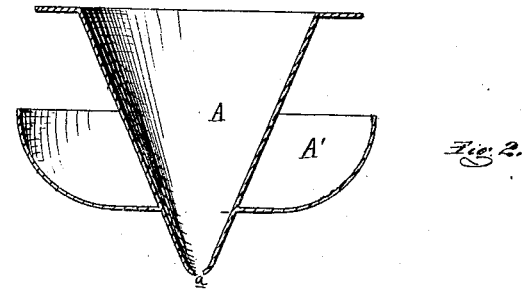

Figure 1 is a perspective view of my soldering-tool from the bottom, and Fig. 2 is a vertical section of the same.

Similar letters of reference indicate corresponding parts in the several figures.

The nature of this invention relates to an improved tool for soldering purposes, in which the solder is kept in a molten state, and from which it flows through a minute aperture to the seam; and it consists in the novel and peculiar construction of the same, as more fully hereinafter set forth.

In the drawing, A represents a metallic vessel in the form of an inverted cone, with a minute longitudinal aperture, $a$, in the apex, and provided with a socket, $b$, projecting from its flanged rim to receive a handle. Surrounding the lower part of the vessel there is an annular bowl or trough, A', secured thereto, in which to place a cotton cloth or wick, to be saturated with kerosene or other hydrocarbon, which, when ignited, will melt the solder and flux contained in the cone, from which it will flow in a fine stream through the aperture $a$ to the seam along which the operator carries the tool.

With this tool the operator delivers the molten solder to the work and distributes it uniformly thereon—an almost impossible condition with the ordinary soldering-iron, especially where but little solder is to be applied.

What I claim as my invention, and desire to secure by Letters Patent, is—

The herein-described soldering-tool, consisting of the conical vessel A, annular cup A', and provided with the aperture $a$ and handle-socket $b$, as shown and set forth.

JOHN C. TAUBER.

Witnesses:
SEYMOUR R. ALLEN,
W. J. SHOEMAKER.